2,868,653

SALAD AND DESSERT TOPPING

Holton W. Diamond, Whiting, Ind., and Eugene L. Powell, Chicago, Ill., assignors, by mesne assignments, to Robert E. Rich, Buffalo, N. Y.

No Drawing. Application December 3, 1954
Serial No. 473,044

5 Claims. (Cl. 99—139)

It is well known that thick cream that is a couple of days old has the ability to "whip." When this phenomenon takes place, two effects are occurring. The obvious one is that air is beaten into the mass and increases its bulk. The other, which is somewhat less obvious but which is more important to give the desired result, is caused by a change in the colloidal structure of the cream. It is known that for cream to whip properly it must be very close to the point where the natural emulsion will break. If one tries to whip cream and does not keep the temperature down, the chances are that the product will not be whipped cream but lumps of butter in the aqueous medium (buttermilk).

When this natural emulsion is whipped under the proper conditions, something which may be termed a partial break in the emulsion takes place but in this case the fat, instead of aggregating in lumps, is itself mixed with the air as it aggregates together and as a result it appears to form a skeleton-like structure in the cells of which the air and watery liquid are entrapped. Because of the formation of this skeleton-like structure, properly whipped cream has the recognized quality of having largely lost its ability to flow. For example, if whipped cream is applied to the surface of another body, such as cake, it will largely hold its shape and will maintain the surface irregularities and points formed as an incident to its application.

The present invention relates to a method of preparing a synthetic emulsion which, like cream, is very close to the break point and which, like cream, contains a fatty ingredient that on beating will both entrain the air and form the skeleton-like structure necessary to give the mass the desired rigidity. It is to be noted that this is quite distinct from the simple ability to retain entrapped air for a limited time which will give the mass increased bulk, as for example, in the manufacture of aerated catsup, aerated mustard, and the like. The desired characteristic which we are seeking to produce can be described as one which gives to the material the ability to whip to develop a structure so that the material will not readily flow out to form a flat surface.

This invention is based upon our discovery that such a structure can be obtained by forming an emulsion comprising water, natural glyceride fats, a substituted cellulose such as methyl cellulose or methylethyl cellulose, and a surfactant (surface active material). The celluloses may be described as celluloses in which at least some of the hydrogen molecules have been substituted with alkyl groups containing not more than two carbon atoms.

The fats employed are any of the natural glyceride fats or oils, but since the product is to be used for edible purposes, the fats employed should be free of undesirable flavors or odors or any toxic bodies. This is understood when one refers to edible fats.

While virtually any of the edible fats may be employed, there appears to be some difference in the way in which they act, depending on the average length of their fatty acid chains.

In this country there is a recognized commercial distinction between the imported or lauric fats and domestic fats, based on the average length of the fatty acid chains predominating in the fat. With minor exceptions, lauric fats contain relatively more of the short fatty acid chains (containing less than 17 carbon atoms per chain), and domestic fats contain relatively more of the long fatty acid chains (containing 17 or more carbon atoms per chain). Of course, it is possible to blend fats so that products are obtained which have characteristics intermediate the two.

When emulsions are prepared using the substituted celluloses referred to with water and edible fats of the type referred to, products are obtained which have the desired characteristics to form rigid structures on whipping but in most instances these emulsions are extremely critical and demand too careful temperature control and the like for commercial use. We have now found that this tendency for the emulsion to break can be overcome and stability of the emulsion adjusted by means of a surfactant of the non-ionic type comprising long-chain fatty acid esters of polyhydric alcohols or their derivatives. Some examples of such surfactants are Spans, Tweens, Vrest, Myverol, and Myrj. These materials are available on the open market and their chemical composition is well known in the art.

Thus, as a commercial matter, it is always advisable to include some surfactant in the emulsion.

Although we do not now understand the exact way in which the surfactant and substituted alkyl cellulose function, we have found that other emulsifying and suspending agents are inoperative for our purpose and we have tried to substitute ordinary materials such as the water soluble salts of carboxymethylcellulose or Irish moss for the substituted alkyl cellulose, but in all cases the emulsion of the aqueous fat dispersion failed to whip properly and it did not have the required rigid structure.

The amount of surfactant recommended for use in our emulsion is ordinarily between 0.15% and 0.6%, with a preferred range falling between 0.2% and 0.5%.

The amount of fat used in the emulsion ordinarily will be between 20% and 40%, irrespective of whether lauric or domestic fat is used.

As regards the substituted cellulose, we may use either methyl cellulose or methylethyl cellulose in an amount ranging from between 0.5% to 3.0%. A preferred range is between 0.8% and 2.0%. Unless otherwise specified, percentages herein are calculated on a weight basis. While we may use either a methyl cellulose or a methylethyl cellulose, we prefer to use the latter in conjunction with the surfactant, as in such case greater stability is had.

The balance of the emulsion is substantially all water, but it is understood that small amounts (as are customary in the trade) of sweetening and flavoring materials may be used. Also without losing the benefits of our invention, other ingredients employed in emulsions may be included such as gelatin, non-fat milk solids, sodium caseinate, neutral soy protein, natural and synthetic gums such as tragacanth and acacia. Water-soluble salts of carboxymethyl cellulose may be included but they in no way serve as a substitute for the methyl or methylethyl cellulose which is essential to our invention. In general, the added ingredients should not constitute more than 10% of the whole.

In preparing the emulsion of the present invention, we preferably soak and thoroughly wet the required amount of alkyl cellulose in approximately one-half the required amount of hot water at a temperature between 50° C. and 100° C. for 5 to 10 minutes. At this temperature the cellulose ether is insoluble in water. The slurry is then cooled with agitation to a temperature between 0° C. and 40° C. and when the temperature drops below 45° C. the cellulose ether goes into solution. The remainder of the water is then added and the mix is agitated at a temperature below 45° C. for 5 to 10 minutes to insure complete solution of the cellulose ether. The temperature of the solution is then raised to between 70° C. and 80° C., at which point the fat and surfactant are added and the solution is gently agitated until all the fat is melted. The desired coloring and flavoring materials are then added and the mix is vigorously agitated for 5 to 10 minutes and then passed through a homogenizer at a presure of about 500 pounds per square inch.

In homogenizing the emulsion, pressures below 500 pounds per square inch are suitable but high homogenization pressures in the neighborhood of 2500 to 3500 pounds per square inch tend to aggregate the fat. Such high presure homogenization may be employed however provided the fat aggregates are later broken up by a second homogenization at pressures below 500 pounds per square inch or by some special device. Where an exceptionally smooth texture is desired a sequence of high and low pressure homogenizing may be used with advantage. After homogenizing, the emulsion is cooled and packaged for distribution.

For additional nutritive value, as well as desirable flavor, materials such as sucrose, corn syrup solids, salt, condiments and flavors can be added in the usual amounts without adversely affecting the properties of the emulsion and such materials are considered to be optional ingredients in the emulsion of my invention.

Our emulsion is adapted to be cooled and packaged in a number of ways depending on the method of distribution and use planned for it. For example, when used as a substitute for whipped cream, it can be cooled on a conventional type dairy surface cooler to a temperature of 0° C. to 15° C. and then held under refrigeration until used. It can also be packaged hot, as for example when flavored with vinegar and condiments for use as a salad garnish. In such case the packaged emulsion is allowed to cool gradually to room temperature. The emulsion may also be sterilized by heat processing for extended shelf life or dried and sold in powdered form. By omitting a portion of the water, it can be made in concentrated form and packaged as such. The finished emulsion can also be quick frozen either with or without aeration for distribution through frozen food outlets. When aerated and frozen it makes a satisfactory low cost frozen dessert. The emulsion may be aerated by mechanical whipping or it may be aerated by extruding it from a container by means of a non-toxic edible gas such as nitrous oxide, carbon dioxide, or mixtures thereof as is customary.

For the purpose of illustration, and in order to point out the best method now known to us for carrying out our invention, the following specific examples are given:

EXAMPLE 1

300 pounds (36 gallons) of water were charged into a 150-gallon steam-jacketed agitator tank. Agitation was started and the temperature of the water raised to about 85° C. 20 pounds of water-soluble methylethyl cellulose was then added and thoroughly wet with water by agitating the mix for about five minutes. After this cold water was circulated in the jacket of the tank until the temperature of the slurry dropped to 25° C. 378 pounds (45.3 gallons) of cold water were added and agitation continued until all the methylethyl cellulose passed into solution. This ordinarily takes about 10 minutes.

The solution was then heated to a temperature of 70° C. and 300 pounds of hydrogenated cottonseed oil, 2 pounds of polyoxyethylene glycol mono-stearate and one ounce of a solution of FD and C Yellow Number 3 were added, and, the mixture gently agitated until all the fat melted. Vigorous agitation was then started and continued for about five minutes. The mixture was then homogenized by passing it through a pressure type two-stage homogenizer at 2500 pounds per square inch pressure at the first stage and 500 pounds per square inch pressure at the second stage. The emulsion was again pased through the homogenizer, using the second stage only at a pressure of about 250 pounds per square inch. After this, the emulsion was cooled to a temperature of about 10° C. on a conventional dairy type cooler and packaged in 5-gallon cans and stored under refrigeration. Subsequently a portion of the emulsion was whipped by mechanical means into a topping which had an extraordinarily smooth texture. The emulsion in changing its physical state retained such a large amount of ingested air that its volume increased to at least 2.5 times the original volume. Separate samples of the resulting topping emulsion were then made acidic and alkaline at pH values ranging from about 2.5 to 9.5 chilled, whipped, and allowed to stand for several hours at room temperature. The topping showed no sign of breakdown. Other liquid samples, at pH values ranging from 2.5 to 9.5 were then subjected to refrigeration at a temperature of 40° F. for several hours and thereafter brought back to room temperature without any apparent change in the consistency or form of the topping.

On a weight basis the emulsion of Example 1 was made up of the following percentages of ingredients:

*Example I*

| Ingredients: | Percentage by weight |
|---|---|
| Water soluble methyl ethyl cellulose | 2.0 |
| Hydrogenated cottonseed oil | 30.0 |
| Polyoxyethylene glycol monostearate | 0.2 |
| Water | 67.8 |
| Total | 100.0 |

The procedure of Example I was employed with the following ingredients. In all cases toppings made with the liquid emulsions proved to be stable to heat and acid.

*Example II*

| Ingredients: | Percentage by weight |
|---|---|
| Water soluble methyl cellulose | 1.5 |
| Hydrogenated coconut oil | 25.0 |
| Sorbitan monostearate | 0.3 |
| Citric acid | 0.5 |
| Water | 72.7 |
| Total | 100.0 |

*Example III*

| Ingredients: | Percentage by weight |
|---|---|
| Water soluble methyl cellulose | 1.5 |
| Hydrogenated cottonseed oil | 30.0 |
| Mixed partial fatty acid esters of glycerol | 0.5 |
| Water | 68.0 |
| Total | 100.0 |

The trade name of the surfactant used in Example 1 is Myrj, in Example 2 it is Span 60, and in Example 3 it is Vrest. Other known surfactants such as, for example, Tweens and Myverol, may also be used in preparing our food emulsion. The chemical compositions of the surfactants are well-known in the art. Spans may be defined as complex mixtures of partial esters of fatty acids and hexitol anhydrides derived from sorbitol, Tweens are complex mixtures of partial esters of fatty acids and sorbitol-derived hexitol anhydrides in which polyoxyethylene chains have been added to the non-esterified hydroxyl groups of the hexitol anhydride, Vrest is the refined complex mixture resulting from the metathetical reaction of complete glyceride fat with an excess of glycerol. It ordinarily contains 35–45% of monoester, Myverol is a complex mixture resulting from the metathetical reaction of complete glyceride fat with an excess of glycerol and purified by distillation under high vacuum to a monoester content of more than 90%, and Myrj is a mixture of the esters resulting from the direct esterification of fatty acid with polymerized ethylene oxide. All of these surfactants are of the non-ionic type comprising long chain fatty acid esters of polyhydric alcohols or their derivatives. The term "long chain fatty acid" is meant to include fatty acids having 12 or more carbon atoms in the chain.

It will be understood that the examples are merely intended to give specific illustrations of the way our invention can be carried out and are not intended to imply any limitations on the variations that may be employed.

I claim:

1. An edible emulsion adapted to be whipped or aerated with an inert non-toxic edible gas to form a firm non-pourable mass by the retention of ingested gas: comprising the essential combination of water; glyceride fat; a relatively minor amount of a cellulose substituted with alkyl groups comprising not more than two carbon atoms and at least part of such groups being methyl; and a relatively minor amount of surfactant selected from the group consisting of complex mixtures of partial esters of fatty acids and hexitol anhydrides derived from sorbitol, complex mixtures of partial esters of fatty acids and sorbitol-derived hexitol anhydrides in which polyoxyethylene chains have been added to the non-esterified hydroxyl groups of the hexitol anhydride, refined complex mixtures resulting from the metathetical reaction of complex glyceride fat with an excess of glycerol, and a mixture of the esters resulting from the direct esterification of fatty acid with polymerized ethylene oxide.

2. An edible emulsion adapted to be whipped or aerated with an inert non-toxic edible gas to form a firm non-pourable mass by the retention of ingested gas: comprising the essential combination of water; glyceride fat; a relatively minor amount of a cellulose substituted with alkyl groups comprising not more than two carbon atoms and at least part of such groups being methyl; and a relatively minor amount of complex mixtures of partial esters of fatty acids and hexitol anhydrides derived from sorbitol.

3. An edible emulsion adapted to be whipped or aerated with an inert non-toxic edible gas to form a firm non-pourable mass by the retention of ingested gas: comprising the essential combination of water; glyceride fat; a relatively minor amount of a cellulose substituted with alkyl groups comprising not more than two carbon atoms and at least part of such groups being methyl; and a relatively minor amount of complex mixtures of partial esters of fatty acids and sorbitol-derived hexitol anhydrides in which polyoxyethylene chains have been added to the non-esterified hydroxyl groups of the hexitol anhydride.

4. An edible emulsion adapted to be whipped or aerated with an inert non-toxic edible gas to form a firm non-pourable mass by the retention of ingested gas: comprising the essential combination of water; glyceride fat; a relatively minor amount of a cellulose substituted with alkyl groups comprising not more than two carbon atoms and at least part of such groups being methyl; and a relatively minor amount of refined complex mixtures resulting from the metathetical reaction of complete glyceride fat with an excess of glycerol.

5. An edible emulsion adapted to be whipped or aerated with an inert non-toxic edible gas to form a firm non-pourable mass by the retention of ingested gas: comprising the essential combination of water; glyceride fat; a relatively minor amount of a cellulose substituted with alkyl groups comprising not more than two carbon atoms and at least part of such groups being methyl; and a relatively minor amount of a mixture of the esters resulting from the direct esterification of fatty acid with polymerized ethylene oxide.

References Cited in the file of this patent

UNITED STATES PATENTS

| 2,344,688 | Folkrod | Mar. 21, 1944 |
| 2,474,019 | Steiner | June 21, 1949 |
| 2,487,698 | Diamond | Nov. 8, 1949 |

FOREIGN PATENTS

| 555,361 | Great Britain | Apr. 15, 1942 |
| 646,484 | Great Britain | Nov. 22, 1950 |